(12) United States Patent
Tsukaguchi

(10) Patent No.: US 7,817,504 B2
(45) Date of Patent: Oct. 19, 2010

(54) DISK APPARATUS

(75) Inventor: Akinori Tsukaguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 324 days.

(21) Appl. No.: 12/084,481

(22) PCT Filed: Dec. 1, 2006

(86) PCT No.: PCT/JP2006/324103

§ 371 (c)(1),
(2), (4) Date: May 2, 2008

(87) PCT Pub. No.: WO2007/083451

PCT Pub. Date: Jul. 26, 2007

(65) Prior Publication Data

US 2009/0128956 A1    May 21, 2009

(30) Foreign Application Priority Data

Jan. 20, 2006    (JP)    ............... 2006-012935

(51) Int. Cl.
*G11B 7/085*    (2006.01)
*G11B 17/26*    (2006.01)

(52) U.S. Cl. .................... 369/30.77; 720/615; 360/133; 360/94

(58) Field of Classification Search .............. 369/30.77, 369/30.76, 30.78, 30.61, 191.1, 75.21, 75.11, 369/77.11, 30.89; 360/133, 94; 720/615, 720/600, 664

See application file for complete search history.

(56) References Cited

U.S. PATENT DOCUMENTS

| 5,544,148 | A | 8/1996 | Nakamichi | |
|---|---|---|---|---|
| 6,262,963 | B1 * | 7/2001 | Nakamura et al. | ....... 369/30.89 |
| 6,396,795 | B2 * | 5/2002 | Nakamura et al. | .......... 720/615 |
| 6,813,772 | B2 * | 11/2004 | Ariyoshi | ..................... 720/600 |

FOREIGN PATENT DOCUMENTS

| CN | 1244014 | 2/2000 |
|---|---|---|
| EP | 1 592 005 A1 | 11/2005 |
| JP | 62-153647 U | 9/1987 |
| JP | 4-35244 U | 3/1992 |
| JP | 7-153223 A | 6/1995 |
| JP | 8-167223 A | 6/1996 |
| JP | 2001-101762 | 4/2001 |
| JP | 2003-118787 A | 4/2003 |
| JP | 2003-157608 A | 5/2003 |

\* cited by examiner

*Primary Examiner*—Ali Neyzari
(74) *Attorney, Agent, or Firm*—Birch, Stewart, Kolasch & Birch, LLP

(57) ABSTRACT

The disk apparatus according to the present invention includes a tray which is elevationally movably disposed within a casing of apparatus integrating a disk reproducing system mechanism and holds a disk to be reproduced thereon, and the tray is provided with a disk supporting section supporting the peripheral edge of the disk such that the recording surface of the disk is floated on the tray.

5 Claims, 7 Drawing Sheets

(A)

(B)

(C)

DISK APPARATUS

TECHNICAL FIELD

The present invention relates to a disk apparatus including a tray stocking a disk for reproduction inside the casing of the apparatus.

BACKGROUND ART

Conventionally, this type of disk apparatus is known for the following arrangement: sheet metallic trays stocking separately a plurality of disks are disposed in a manner enabling a vertical drive within the casing of an apparatus integrating a disk reproducing system mechanism, disks inserted in the apparatus casing are held on the trays, and the tray is driven to a disk-reproducing position or a reproduction-retracting position.

It is noted that the above-mentioned prior art is a technology known to those skilled in the art, and not concerned with the invention of publications.

However, as the invention known to the publications, there has been known a structure serving as a disk housing case, where a synthetic-resin case main body is provided with projections and spring pieces protrudingly formed on the inner peripheral surface of the circular holding member of the case main body, and the outer peripheral edge of a disk is inserted in the clearance between the projections and the case main body, to thereby hold and fix the disk therein (Patent Document 1).

Patent Document 1: JP-A-2003-118787

Since the conventional disk apparatus is arranged as mentioned above, there is a problem that when a disk is held on a sheet metallic tray in a surface contact condition, especially in the case of an on-vehicle disk apparatus, scratches may occur with the tray surface on the recording surface of the disk because of vibrations and the like.

The present invention has been made to solve the above-mentioned problems, and an object of the present invention is to provide a disk apparatus with a high reliability capable of preventing the recording surface of the disk held on the tray from being scratched because of galling with the tray.

DISCLOSURE OF THE INVENTION

The disk apparatus according to the present invention includes a tray which is disposed in a manner enabling a vertical drive within a casing of apparatus integrating a disk reproducing system mechanism and holds a disk to be reproduced, wherein the tray is provided with a disk supporting section supporting the peripheral edge of the disk such that the recording surface of the disk is floated or upwardly isolated on the tray.

According to the present invention, the disk supporting section provided on the tray is arranged to support the peripheral edge of the disk such the recording surface of the disk is floated on the tray. In this way, the occurrence of scratches with the tray can be prevented on the recording surface of the tray, the reliability of the disk apparatus of a disk stock type can be improved.

BRIEF DESCRIPTION OF THE DRAWINGS

FIG. 6(A) is a schematic plan view showing a tray associated with a disk; FIG. 6(B) is a sectional view taken along the line C-C of FIG. 6(A); and FIG. 6(C) is a sectional view taken along the line D-D of FIG. 6(A).

FIG. 7(A) is a schematic plan view showing a tray associated with a disk; FIG. 7(B) is a sectional view taken along the line E-E of FIG. 7(A); and FIG. 7(C) is a sectional view taken along the line F-F of FIG. 7(A).

BEST MODE FOR CARRYING OUT THE INVENTION

Embodiments of the present invention will now be described with reference to the accompanying drawings in order to explain the present invention in more detail.

First Embodiment

Figure 1:
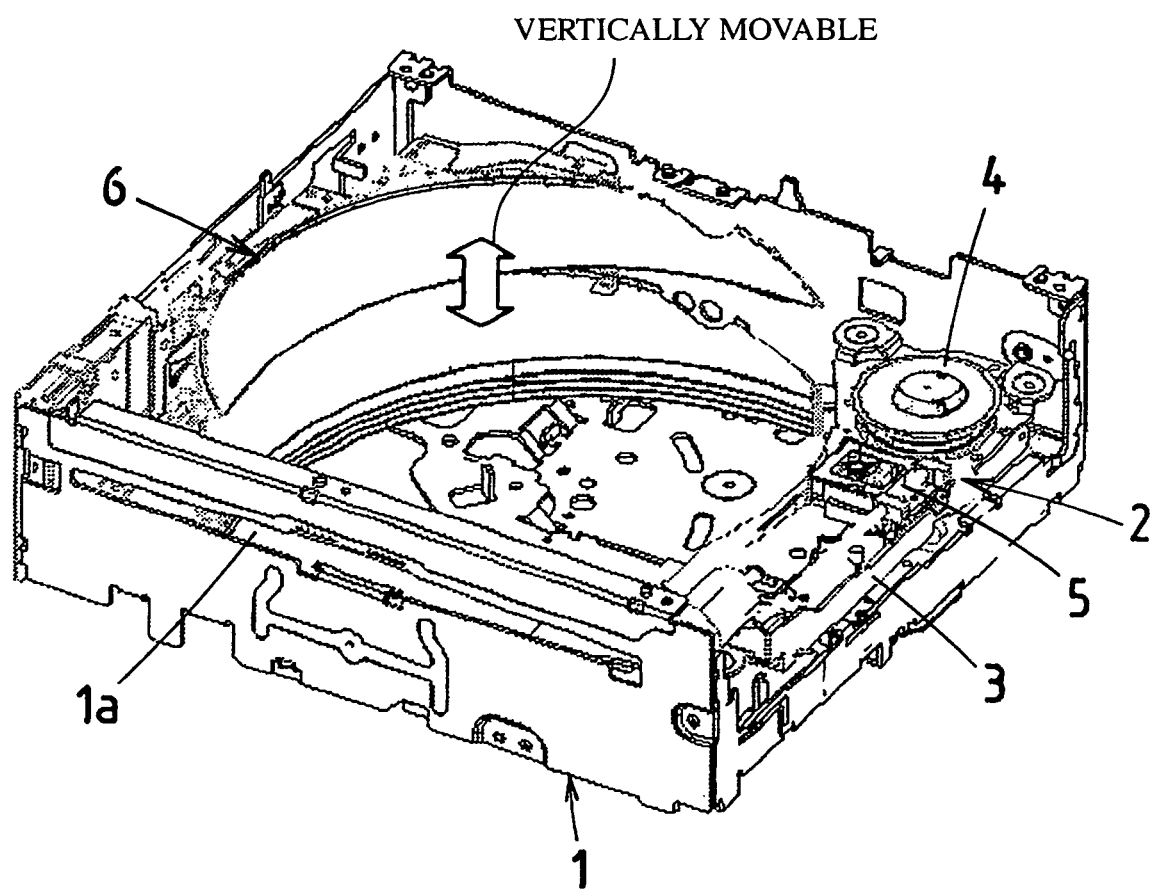
FIG. 1 is a schematic perspective view showing a display apparatus with the top plate removed according to the first embodiment of the present invention.
Figure 2:
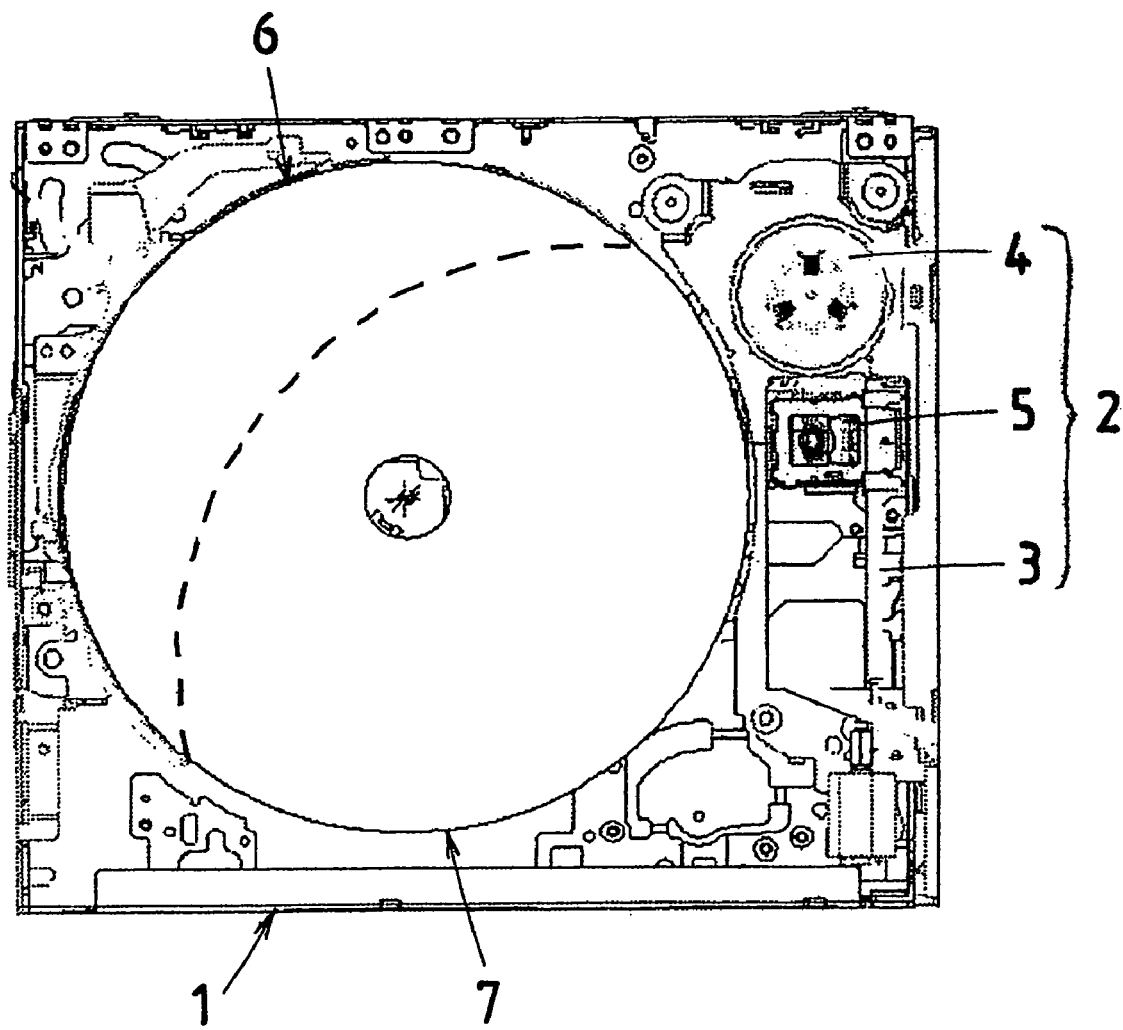
FIG. 2 is a schematic plan view showing the display apparatus with a disk held therein shown in FIG. 1.
Figure 3:
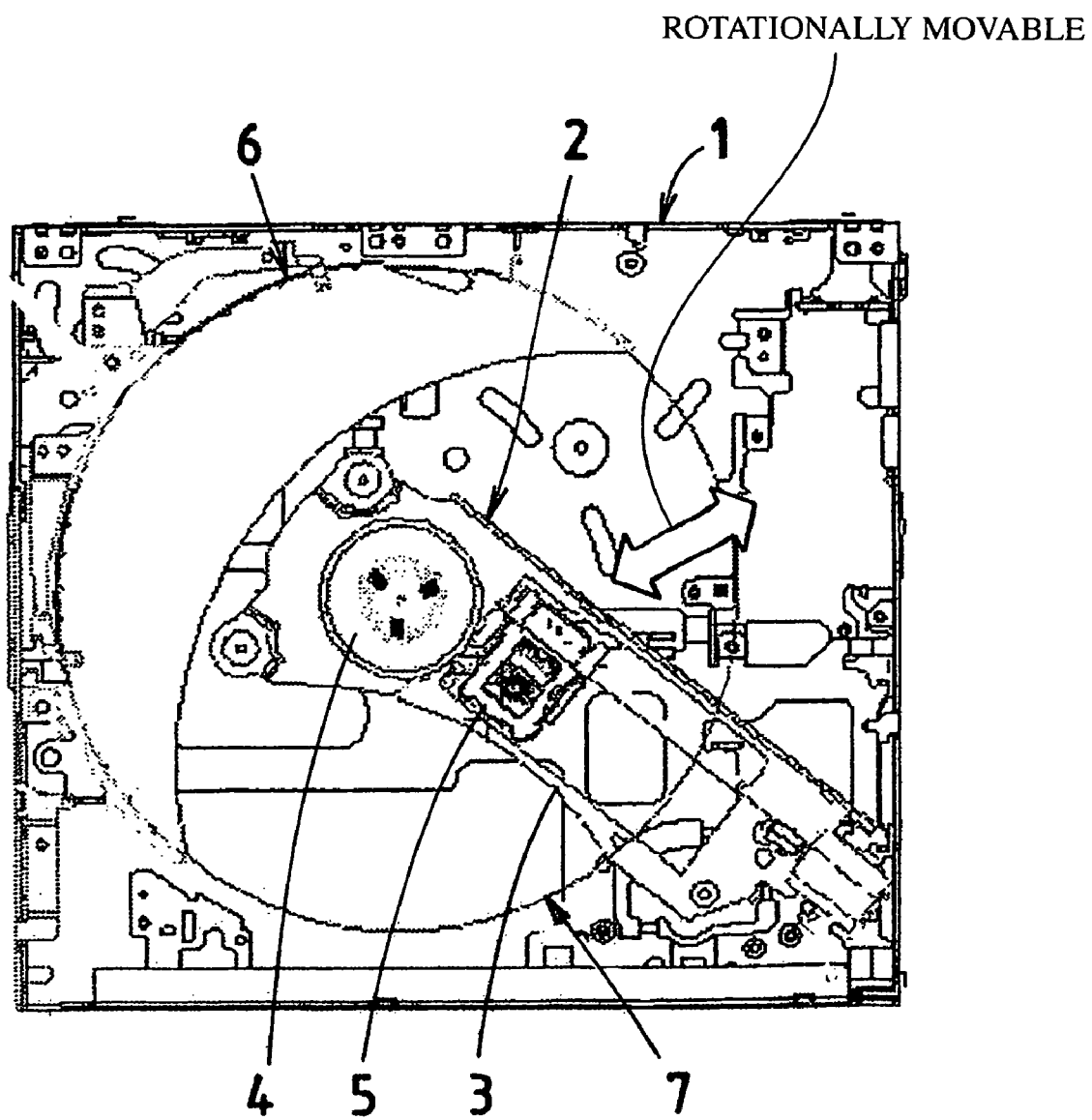
FIG. 3 is an explanatory view of the operation of the display apparatus shown in FIG. 2, where a disk is being reproduced.
Figure 4:
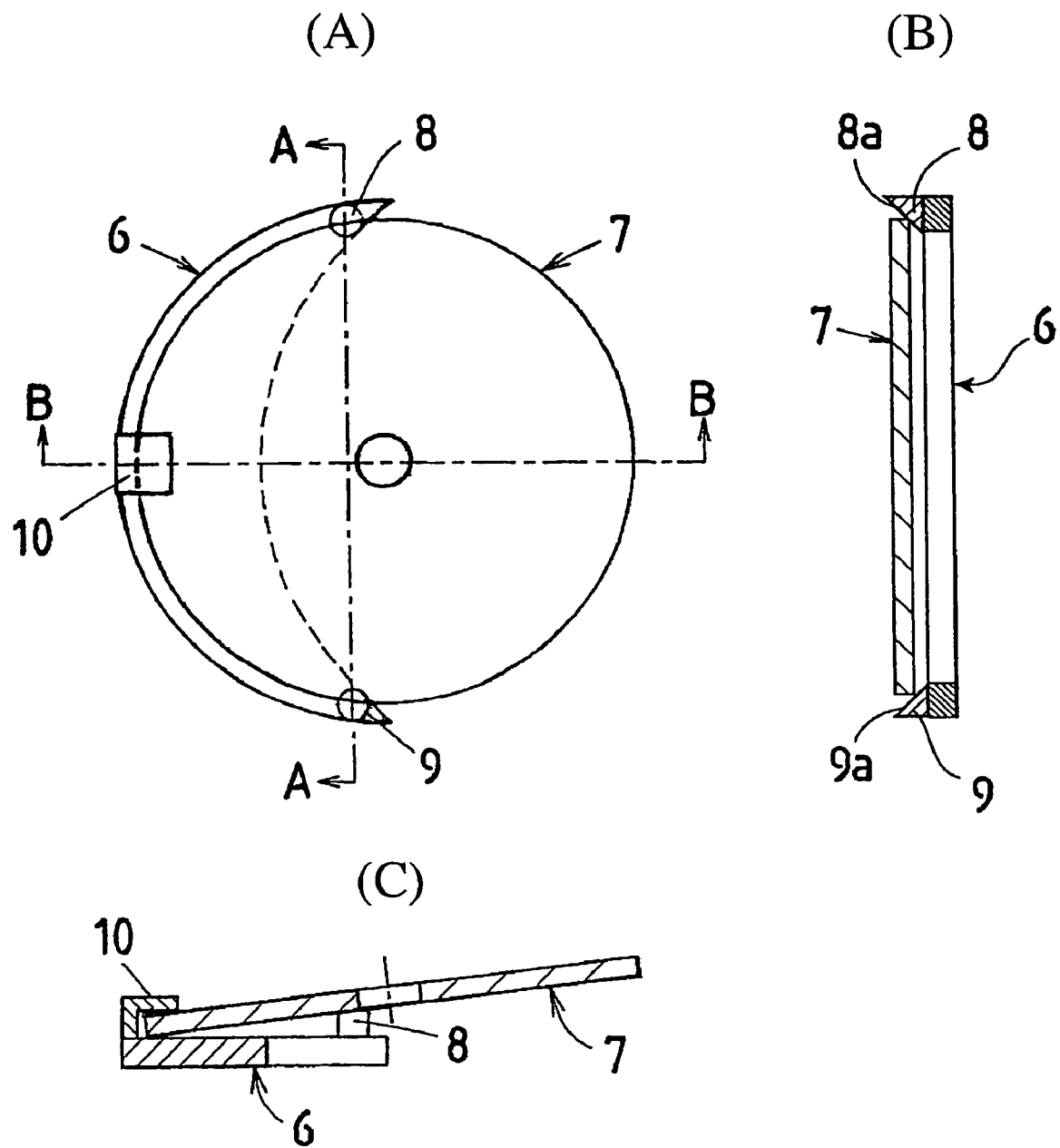
FIG. 4(A) is a schematic plan view showing a tray associated with a disk.
FIG. 4(B) is a sectional view taken along the line A-A of FIG. 4(A).
FIG. 4(C) is a sectional view taken along the line B-B of FIG. 4(A).

FIG. 1 is a schematic perspective view showing a display apparatus in a top-plate removed state according to the first embodiment of the present invention. FIG. 2 is a schematic plan view showing a disk stocking state in FIG. 1. FIG. 3 is an explanatory view in the operation upon reproduction of a disk in FIG. 2. FIG. 4(A) is a schematic plan view showing a tray associated with a disk. FIG. 4(B) is a sectional view taken along the line A-A of FIG. 4(A). FIG. 4(C) is a sectional view taken along the line B-B of FIG. 4(A).

The disk apparatus shown in FIG. 1 includes an apparatus casing 1 having a disk insertion/ejection slot 1a through its front face; a disk reproducing system mechanism 2 that is disposed within the apparatus casing 1 and is swingingly driven or moved to a disk-reproducing position and a reproduction-retracting position; and trays 6 vertically stacked at plural stages disposed in a manner enabling a vertical drive within the apparatus casing 1.

The disk reproducing system mechanism 2 includes a disk reproducing lever 3 of which the one longitudinal end is horizontally rotatably journaled and which is swingingly moved to the disk-reproducing position and the reproduction-retracting position by a drive means (not shown); a disk mounting turntable 4 that is mounted on the side of the tip end of the disk reproducing lever 3 and is rotationally driven; and a pickup 5 that is mounted on the disk reproducing lever 3 and is moved in a direction toward or away from the turntable 4 by screw feed drive.

Each of the trays 6 holds a disk 7 to be reproduced successively inserted through the disk insertion/ejection slot 1a of the apparatus casing 1, and each of the trays 6 is provided with disk supporting sections 8, 9, and 10 supporting the peripheral edge of the disk 7 such that the recording surface of the disk 7 is floated on the surface of the tray 6. In further detail, each of the trays 6 is formed of semicircularly blanked metallic material (for example, aluminum and the like) having a semicircularly arcuate outer peripheral edge, and the tray shown as an example in the figure is formed of flat and substantially crescent-shaped metallic material. In the first embodiment, the disk supporting sections 8, 9, and 10 provided on the tray 6 are composed of, as shown in FIG. 4(A), upward disk supporting projections 8, 9 provided at the two ends of the flat and substantially crescent-shaped tray 6, and supporting the positions substantially symmetrical to each other at the outer peripheral edge of the disk 7, and a one-sided disk fitting section 10 which is provided at the peripheral middle portion of the tray 6, and fits and holds the edge portion in the middle between the disk supporting projections 8, 9 at the outer peripheral edge of the disk.

Here, each of the disk supporting projections 8, 9 is composed of an outsert molded resin material provided on the top face of each end of the tray 6 formed of flat and substantially crescent-shaped metallic material as stated previously, and the disk supporting projections 8, 9 are provided with, as shown in FIG. 4(B), taper surfaces 8a, 9a, respectively, that abut and support the outer peripheral lower edge portions of the disk 7 that are located at positions substantially symmetrical to each other in a radial direction of the disk 7. To be specific, the disk supporting projections 8, 9 and the one-sided disk fitting section 10 are provided on the face of the metallic plate of the tray 6 forming a plane and substantially crescent shape, and the taper surfaces 8a, 9a of the disk supporting projections 8, 9 are arranged to hold the disk 7 such that the disk 7 of which the part of the outer peripheral edge is fitted in the one-sided disk fitting section 10 is maintained in a sloped condition where the side of the disk 7 opposite the one-sided disk fitting section 10 is held at a higher position.

The operation thereof will now be described below.

As shown in FIG. 1 and FIG. 2, a disk is replaced in a state where the disk reproducing system mechanism 2 is in a retracting position; in reproducing the disk, after the tray 6 holding the disk 7 to be reproduced is moved to a predetermined height position; the disk reproducing system mechanism 2 is swingingly displaced to the disk-reproducing position shown in FIG. 3; and subsequently, the tray 6 is downwardly moved, thus transferring the disk 7 to the turntable 4 on the disk reproducing system mechanism 2. While the turntable 4 is rotated under such a condition, the pickup 5 is driven to reproduce the disk 7.

According to the aforementioned first embodiment, the disk 7 is arranged to be held such that the recording surface of the disk 7 is in a floating state on the tray 6 by means of: the two disk supporting projections 8, 9 which are provided at both the ends of the metallic tray 6 given in a flat and substantially crescent shape, and abut and support the positions substantially symmetrical to each other of the outer peripheral edge of the disk 7; and the one-sided disk fitting section 10 which is provided in the middle between the disk supporting projections 8, 9 at the outer peripheral portion of the tray 6 and fits a portion of the outer peripheral edge of the disk 7. Therefore, even in an on-vehicle disk apparatus susceptible to an external force such as vibrations, the recording surface of the disk 7 stocked on the tray 6 can be prevented from being damaged because of scratches with the tray 6.

Further, it is arranged such that the two disk supporting projections 8, 9 and one point of the one-sided disk fitting section 10 hold the disk 7 in a sloping condition where the one-sided disk fitting section 10 side of the disk is lowered and the side of the disk opposite to the one-sided disk fitting section 10 is heightened. In this way, although the tray 6 has a so-called semicircularly blanked shape such as a plane and substantially crescent shape, the risk such that the disk 7 held on the tray 6 is trailed down can be eliminated.

Here, conventional disk apparatuses of a disk storage type include a disk apparatus where a circular projection or several half-blanked projections for supporting a disk are provided on its metallic tray for countermeasures for preventing the damaged disk. However, in the case of a tray where such a circular projection cannot be provided, that is, in the case of a tray which is that formed in a semicircularly blanked shape such as a plane and substantially crescent shape like the tray 6 according to the present invention, it is impossible to hold the disk 7 on the tray with favorable stability. Despite that, according to the first embodiment of the present invention, even the tray 6 in a semi-circularly blanked shape can steadily hold the disk 7 by means of the disk supporting projections 8, 9 and the one-sided disk fitting section 10. Furthermore, a metallic tray provided with half-blanked projections is prone to have poor flatness accuracy; however, according to the first embodiment of the present invention, since the two ends of the tray 6 having a semicircularly blanked shape are arranged to be provided with disk supporting projections 8, 9 made of an outsert molded resin, the flatness accuracy of the metallic tray may also be improved.

Second Embodiment

Figure 5:
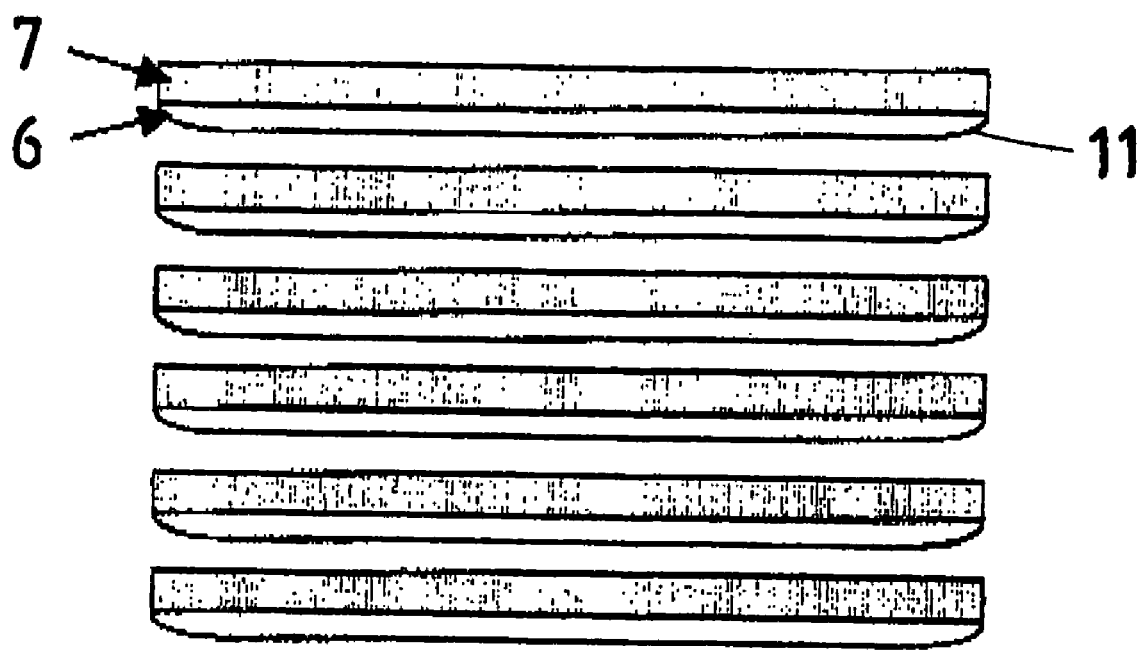
FIG. 5 is a schematic side view showing trays included by a disk apparatus according to the second embodiment of the present invention associated with disks.

FIG. 5 is a schematic side view showing the trays of a disk apparatus according to the second embodiment of the present invention associated with disks. The same or corresponding parts as those in FIGS. 4(A), 4(B), and 4(C) are designated by similar numerals to omit the repetitive explanation.

In the above first embodiment, the two ends of the metallic tray 6 formed in a flat and substantially crescent shape are provided with upward disk supporting projections 8, 9 formed of an outsert molded resin, respectively, and moreover, the peripheral middle portion of the metallic tray 6 is provided with the one-sided disk fitting section 10. However, in the second embodiment, in addition to the one-sided disk fitting section 10 provided on the peripheral middle portion of the metallic tray 6, the whole semicircularly arcuate outer peripheral edge of the tray is provided with an upward disk supporting projection 11, and the inner peripheral section of the disk supporting projection 11 is formed with a taper surface abutting and supporting in a line contact condition the portion of the outer peripheral edge of the disk 7 located in the substantially semicircularly arcuate area of the tray in the outer peripheral edge thereof.

According to the thus constructed second embodiment, the disk 7 can be more steadily held on the metallic tray 6 formed in a flat and substantially crescent shape, and as with the first embodiment, the recording surface of the disk 7 can be prevented from being damaged because of scratches with the tray 6.

Third Embodiment

Figure 6:
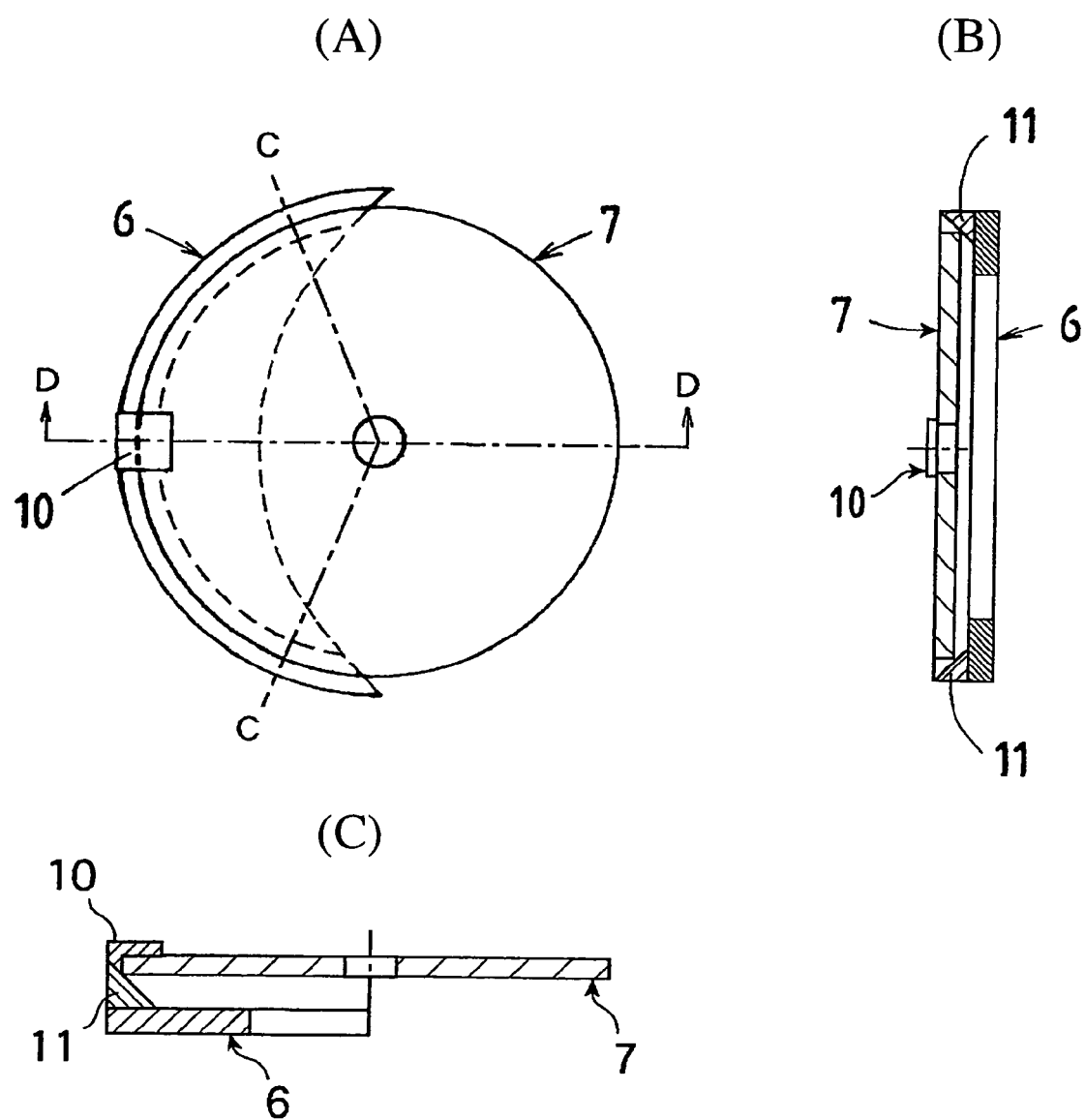
FIGS. 6(A)-(C) illustrate explanatory views showing a disk apparatus according to the third embodiment of the present invention.

FIGS. 6(A), 6(B), and 6(C) are a schematic flat view, a sectional view, and another sectional view, respectively, showing the tray included by a disk apparatus according to the third embodiment of the present invention associated with a disk. The same or corresponding parts as those in FIGS. 4(A), 4(B), and 4(C) are designated by similar numerals to omit the repetitive explanation.

In the aforementioned first embodiment, it is explained that the disk is received inclining to the tray as shown in FIG. 4(C); however, as shown in FIG. 6(C), the tray may be formed such that the disk is held substantially parallel to the holding surface of the tray.

According to the thus constructed third embodiment, an advantageous effect similar to that of the first embodiment can be obtained.

Fourth Embodiment

Figure 7:
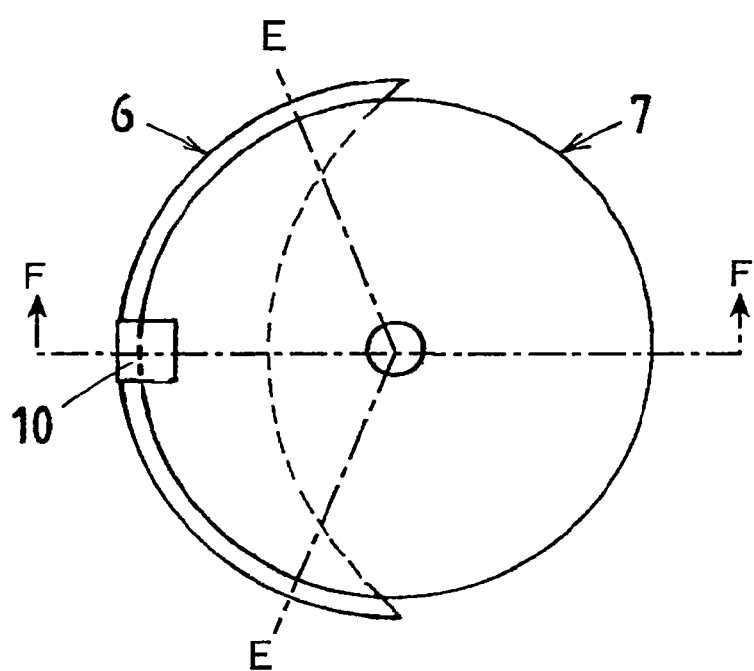
FIGS. 7(A)-(C) illustrate explanatory views showing a disk apparatus according to the fourth embodiment of the present invention.
Figure 7:
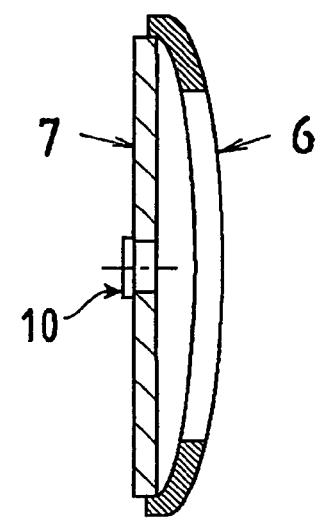
Figure 7:
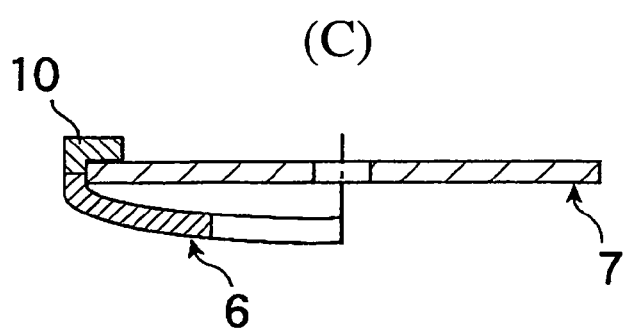

FIGS. 7(A), 7(B), and 7(C) are a schematic flat view, a sectional view, and another sectional view, respectively, showing the tray of a disk apparatus according to the fourth embodiment of the present invention associated with a disk. The same or corresponding parts as those in FIGS. 4(A), 4(B), and 4(C) are designated by similar numerals to omit the repetitive explanation.

In the fourth embodiment, in addition to the one-sided disk fitting section provided on the peripheral middle portion of the metallic tray 6, a metallic tray itself is formed in a downwardly convex shape as shown in FIG. 7(B), and thereby, the tray is arranged to abut and support the disk such that the underside of the outer peripheral edge of the disk makes a line contact with the upper outer peripheral edge of the substantially semicircularly arcuate area of the metallic tray.

According to the thus arranged fourth embodiment, an advantageous effect similar to that of the second embodiment can be obtained.

INDUSTRIAL APPLICABILITY

As mentioned hereinabove, the disk apparatus with high reliability according to the present invention, which is capable of preventing the recording surface of a disk held on a tray from being damaged through scratches with the tray, is suitable, for instance, for use in on-vehicle disk reproducing apparatuses used in an environment susceptible to vibrations.

The invention claimed is:

1. A disk apparatus including a tray which is disposed in a manner enabling a vertical drive within a casing of apparatus integrating a disk reproducing system mechanism and stocks a disk to be reproduced,
   wherein the tray is provided with a disk supporting section supporting the peripheral edge of the disk such that the recording surface of the disk is floated on the tray,
   wherein the disk supporting section comprises:
   upward disk supporting projections which are provided at the two ends of a semicircularly blanked tray having a semicircularly arcuate outer peripheral edge, and support positions substantially symmetrical to each other of the outer peripheral edge of the disk; and
   a one-sided disk fitting section which is provided in the outer peripheral middle portion of the tray, and fits and holds the portion of the outer peripheral edge of the disk in the middle between the disk supporting projections.

2. The disk apparatus according to claim 1, wherein the disk supporting projection comprises a taper surface abutting and supporting the outer peripheral lower edge portions located at positions substantially symmetrical to each other in a radial direction of the disk.

3. The disk apparatus according to claim 1, wherein the disk supported on the tray by the one-sided disk fitting section and the disk supporting projections is held in an inclined condition where the side of the disk which is fitted and held by the one-sided disk fitting section is held at a lowermost position and the side thereof opposite from the one-sided disk fitting section is held at a higher position.

4. The disk apparatus according to claim 1 wherein the tray is formed of a metallic material and the top surface of the two ends of the metallic tray is provided with the disk supporting projection made of a resin.

5. A disk apparatus including a tray which is disposed in a manner enabling a vertical drive within a casing of apparatus integrating a disk reproducing system mechanism and stocks a disk to be reproduced,
   wherein the tray is provided with a disk supporting section supporting the peripheral edge of the disk such that the recording surface of the disk is floated on the tray; and
   wherein the disk supporting section forms a convexity where a portion of the tray downwardly projects such that the disk supporting section abuts and supports the substantially half-circumference of the outer peripheral edge of the disk.

* * * * *